May 18, 1943. R. H. MORGAN 2,319,467
VERNIER TYPE POSITIVE ADJUSTABLE BORING BAR
Filed Dec. 15, 1941
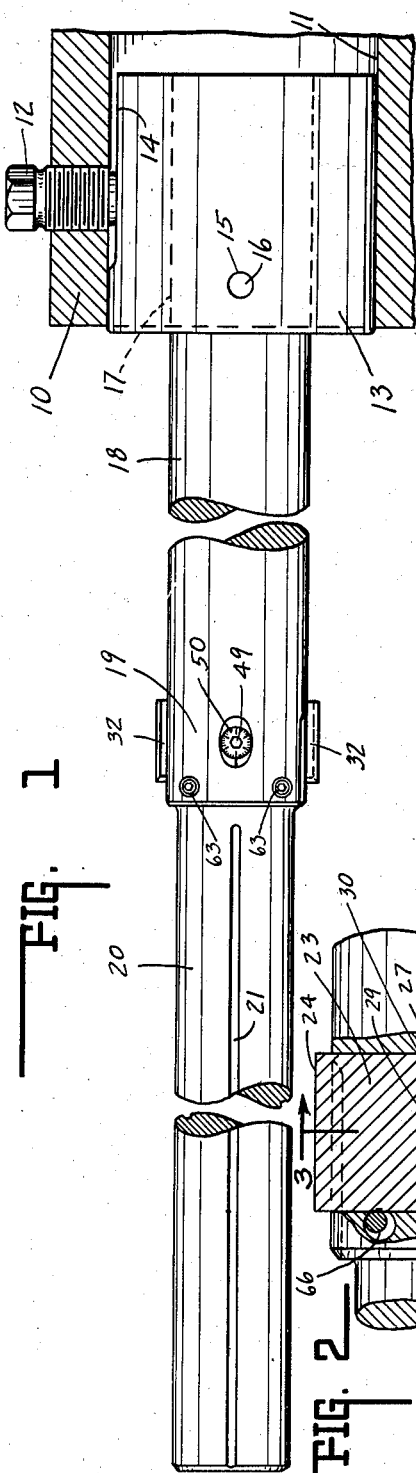
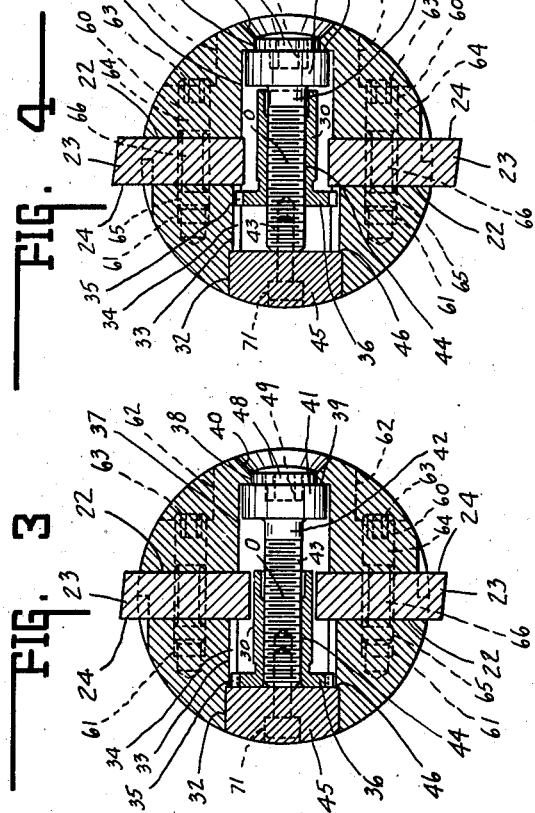
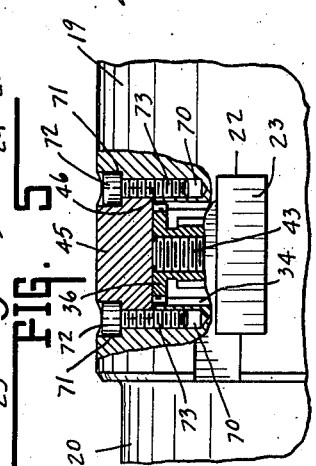
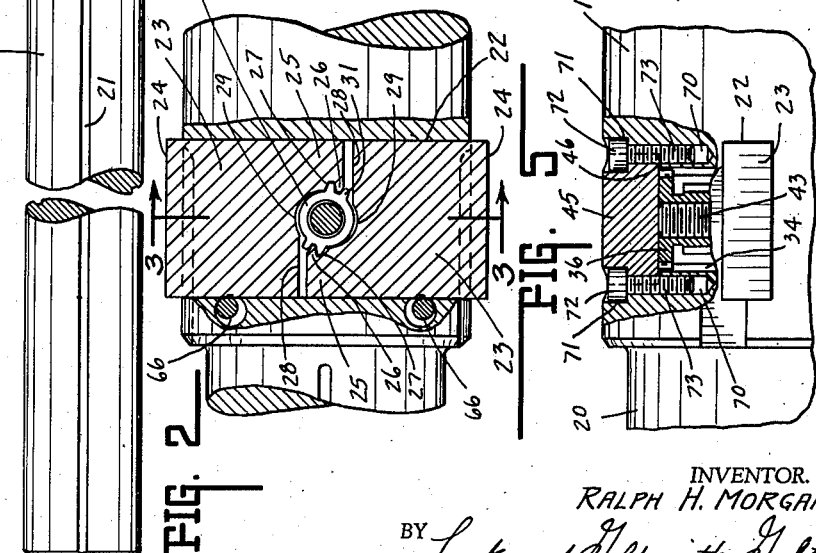
INVENTOR.
RALPH H. MORGAN.
BY Lockwood, Goldsmith & Galt,
ATTORNEYS.

Patented May 18, 1943

2,319,467

UNITED STATES PATENT OFFICE 2,319,467

VERNIER TYPE POSITIVE ADJUSTABLE BORING BAR

Ralph H. Morgan, Indianapolis, Ind., assignor to Chas. Drexler Co., Indianapolis, Ind.

Application December 15, 1941, Serial No. 422,946

20 Claims. (Cl. 77—58)

This invention relates to a vernier type adjustable boring bar for turret latches, and the like.

The boring bar embodying the invention is receivable by a socket in a turret mounted on a lathe for work purposes. Such a turret may be of the vertical or longitudinal type or may be angularly positioned as well understood in the machine tool industry, although the bar per se may be otherwise supported for work purposes.

The chief object of this invention is to provide a bar with a cutting blade arrangement which may be readily and accurately adjusted for boring a predetermined size circular hole, or the like.

While the invention is herein illustrated and described hereinafter as applied to a boring bar having a pair of diametrically positioned cutting blades, the invention, of course, may be duplicated in the cutting bar structure for forming multiple cutter arrangements in a boring bar. Since such multiple cutting arrangements are old and well known in the industry, the invention is illustrated and described in its simplest form, to-wit, a singular cutting arrangement.

The chief feature of the invention consists in the mounting of the cutting blades, means for adjusting the blades to predetermined position and the means for holding the blades in the adjusted position, the construction being of such character that there is substantially no back lash and play in the respective parts, except that absolutely necessary for operation, to-wit, that known as the specified necessary clearance.

The invention herein illustrated, it is to be understood, is arranged to take one pair of cutting blades and by way of example, accommodate a range of from 2½" to 3" in diameter of bore to be formed by said blades. By substituting longer blades the same arrangement, by way of example only, can form a bore from 3" to 3½" in diameter and in view of the aforesaid, therefore, it will be quite evident that the adjusting mechanism is capable of insuring a range of movement for each blade of slightly more than ¼" so that the total range of adjustability with respect to the size of hole to be formed is approximately ½", since the cutting blade arrangement, as stated hereinbefore, comprises a pair of blades diametrically positioned with respect to each other.

Other objects and features of the invention will be set forth in detail more fully hereinafter.

The full nature of the invention will be understood from the accompanying drawing and the following description and claims:

In the drawing,

Fig. 1 is a side plan view of a portion of a turret head, the mounting of the boring bar embodying the invention in the socket of said head and the boring bar including the adjustable element and the locking elements thereof, together with the pilot portion of said bar.

Fig. 2 is an enlarged central elevational view, parts being broken away to show in central section the blade portion of the invention and the immediately associated mechanism.

Fig. 3 is a transverse sectional view taken on line 3—3 of Fig. 2, and in the direction of the arrows.

Fig. 4 is a view similar to Fig. 3 with the blades shown in the maximum extended position, Fig. 3 illustrating the blades in the maximum retracted position.

Fig. 5 is a plan view taken at right angles to Fig. 2, parts being broken away to show the same in section and other parts in elevation and in central section.

In Fig. 1 of the drawing, the numeral 10 indicates a portion of a main head turret, 11 a boring bar receiving socket therein and 12 a boring bar socket locking member in the form of a screw.

Receivable by said socket—see Fig. 1—is a head collar 13 which is provided with a flattened face 14 engageable by the locking member 12. This collar is provided with a tapered hole 15 to receive a tapered pin 16. The head collar is provided with a bore 17 which receives one end 18 of the boring bar proper, the latter being provided with a corresponding hole registering with the hole 15 in the head collar, so that the tapered pin 16 rigidly unites the head collar 13 and bar 18 together. All of the aforesaid is substantially conventional construction.

The boring bar 18 intermediate its ends, includes a portion 19 to which reference will be had more fully hereinafter. Extending therefrom is the slightly reduced pilot portion 20 and the same herein is shown as of somewhat appreciable length. This pilot portion, if desired, may be provided with oil grooves 21.

It is to be observed that as previously stated, that which is included in the portion 19 of the boring bar and illustrated more fully in Figs. 2 to 5, inclusive, may be duplicated for a boring bar having multiple cutting arrangements.

Reference now will be had to Figs. 2 to 5, inclusive. The portion 19 is provided with a diametrical slot 22 extending entirely through the same and in it is slidably mounted the blades 23, each blade having a projectable portion 24 for cutting purposes. Each blade is elongated as at 25 and this elongated portion is provided with a tooth 26 of rack type and a groove 27 of similar type, this in effect forming two adjacent rack teeth 26. As shown clearly in Fig. 2 the elongated portions of the two blades lap each other, as it were. Each of the blades between the rack tooth portion and the face 28 is provided with a curved formation 29 for pionion clearance.

It will be apparent—see Fig. 2—the two curved portions 29 form a space when the blades are fully retracted to their minimum cutting diameter so that in said substantially circular space, as it were, there may be provided a pinion 30 which—see Figs. 3 to 5, inclusive—is appreciably elongated. This pinion, coextensive with the major portion of its length, is provided with a plurality of spur gear teeth 31 and herein two are illustrated.

The portion 19 of the boring bar—see Figs. 3 and 4 more particularly—is provided with a bore 32 that has an axis substantially transverse to the slot 22 and also transverse to and intersecting the axis of the boring bar, indicated by the letter O. Extending inwardly therefrom is a reduced portion 33. This reduced portion is provided with a helical gear tooth portion 34 for meshing with the larger diameter helical tooth portion 35 carried by the end of the pinion 30 and indicated by the numeral 36.

On the opposite side of the bore 32 is another and reduced bore portion 37 and beyond the same is a further reduced portion 38 forming the shoulder 39. The portion 38 is flared outwardly as at 40.

A screw element having the head portion 41 is seated in the bore portion 37 and has one face bearing against shoulder 39. Extending toward the blade is the stem portion 42, and the same is threaded as at 43. The elongated pinion 30 is also interiorly threaded as at 44 so that as this bolt structure is rotated, the elongated pinion will be caused to move to the right in Fig. 3 or to the left in Fig. 4 for advancing or retracting the diametrically positioned blades 23.

A retainer 45 is positioned in the bore 32 and is held in predetermined position therein by the shoulder 46 between the bore portions 32 and 33. This retainer serves to prevent axial movement of the bolt member 42 yet the shoulders 39 and 46 are shown spaced so that there is just sufficient clearance to permit this bolt to rotate. The retainer 45 serves as a stop for the elongated pinion structure and is engaged by the helical tooth portion 36 or rather the end face thereof when the blades are fully retracted, as shown in Fig. 3.

The bolt 41—42 includes an opposite extension 48 and the same—see Fig. 1—is provided with a hexagonal socket 49. The periphery of this socket formation is provided with a scale 50 graduated in thousandths and with the particular mechanism illustrated herein, one turn of the adjusting bolt results in a change of .045" in diameter of the bore to be cut by the blades. The tapered wall 40 is provided with a zero mark or graduation for ease of reading the adjustment.

As the bolt is rotated, it will be apparent that since the bolt is fixed against axial movement, it imparts axial movement of the elongated pinion 30. Since this pinion, because its helical toothed gear portion 35 engages the toothed portion 34, must rotate as the pinion is moved to the right or left, depending upon the direction of turning of the adjusting bolt, this pinion rotation is in accordance with and proportional to such bolt turning movement.

In this rotational movement of the elongated pinion, the spur gear tooth portions thereof, indicated by the numeral 31, being in engagement with the rack tooth portions 26 of the extensions 25 of the blades 23, cause said blades to move outwardly and separate, or inwardly towards each other, depending upon the direction of rotation of the adjusting bolt.

It will be apparent that due to the helical tooth arrangement and a conventional thread arrangement between the elongated pinion and the adjusting bolt that the bolt may be turned many times while the rack teeth rotate clockwise or counterclockwise, as the case may be, approximately 90°. It will be observed that in the fully advanced position of the blades as well as in the fully retracted position of the blades, the rack teeth of the blades engage the latter top teeth of the pinion.

The foregoing constitutes a complete description of the mechanism for adjusting the blades to the predetermined position and for accurately adjusting the same. The means for locking the blades in the adjusted position now will be described.

Extending transversely across the slot and parallel to the axis of the bolt and at opposite sides of the said bolts, are the threaded bores 60 and 61, the two numerals indicating portions of the same bore at opposite sides of the slot 22.

The head 19 is reduced as at 62 to provide clearance for the Allen type locking screw and exposing the head 63 thereof. This Allen type locking screw has two portions 64 and 65, each threaded for threaded engagement with the interior of the threaded portions 60 and 61. The intermediate portion of the Allen screw is cut away and reduced to cylindrical form 66, as shown more clearly in Fig. 2. The axis of this cylindrical portion is eccentric of the axis of the screw so that when the screw is turned into one position, this eccentric portion has no contact with the adjacent portion or face of the blade, but when turned into another position it does engage said blade and locks the same in the adjusted position.

It will be apparent that the threaded arrangement for mounting this eccentric lock advances and retracts the screw so accordingly, the eccentric cylindrical portion is sufficiently elongated or longer than the width of the slot 20, so that no threaded portion can engage and only the cylindrical portion will engage the blade for locking the same. Thread mounting of this lock member also serves to retain the same within the bar and also to retain the same in the locking position.

One means for holding the retainer 45 in place is illustrated more clearly in Fig. 5. Herein it will be observed that there are provided bores 70 which are internally threaded and a portion of said bore is formed in the retainer and in the portion 19 at the outer ends of said bore. The inner ends of said bores are formed fully with the portion 19. The extreme outer ends of said bore 70 are enlarged as at 71. The Allen type cap screws, having the head portion 72 and the threaded portion 73, are threaded into the threaded portion of the bores and the head portion nests in the enlarged portion 71. All of the threading, accordingly, may, if desired, be included in that portion of the bore 70 that is formed within the portion 19. In this manner the retainer 45 is rigidly held against the shoulder 46 before mentioned.

It will be noted that with substantially minimum conventional clearances between the parts that there is substantially no back lash and it will also be observed that the retainer 45 prevents end play relative to the adjusting bolt and insures positive travel of the elongated pinion, as desired. It will also be observed that the helical type pinion arrangement 36 acts as a bearing for the elongated pinion and maintains pinion alignment.

As previously described, the approximate range of adjustment is ½". It will also be noted, as previously described, that the two blades 23 shown in Fig. 2, may be replaced by longer blades so that one cutting bar is adapted to receive different lengths of cutting blades. For that reason, therefore, the scale is shown in thousandths of an inch without designating any positive measurement, for it is observed that for any given rotational movement of the adjusting bolt, the blades will be advanced or retracted as the case may be, a specified amount so that the resulting diameter of necessity will be dependent upon the length of the blades then included in the blade slot and subject to said adjustment.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In an adjustable boring bar structure, the combination with a body portion having a central chamber and a plurality of radially directed slots extending outwardly therefrom and to the body portion exterior, a cutting blade slidable in each slot, an adjusting bolt having a tool engageable body portion exposed end and a threaded portion in the chamber, an elongated pinion having threaded connection with the bolt, a threaded connection between a wall of said chamber and the pinion and of a character to rotate the pinion in axial movement of the pinion incident to bolt rotation and at a rate other than that of the bolt, elongated teeth on the pinion, complementary teeth on the slot receivable ends of the blades, the two last mentioned types of teeth being in constant mesh for positive blade movement in the slots proportional to bolt rotation and in opposite directions.

2. A structure as defined by claim 1, characterized by the addition of means for locking the blades in adjusted position.

3. A structure as defined by claim 1, characterized by the addition of means for locking the blades in adjusted position, said means including an individual lock of eccentric character for each blade.

4. A structure as defined by claim 1, characterized by the slots being aligned, and the blades being an even number and diametrically positioned in the body portion.

5. A structure as defined by claim 1, characterized by the second mentioned threaded connection being of helical gear type, the pinion teeth being of spur gear type and the blade meshing teeth being of rack type.

6. A structure as defined by claim 1, characterized by the chamber being elongated and having an axis transverse to the body portion axis, the chamber opening at opposite ends upon the exterior of the body portion, the adjusting bolt having a face adjacent the tool engageable portion thereof and bearing upon a shoulder in said chamber opening at one end, and means in the opening at the opposite end preventing axial movement of the bolt in the chamber.

7. A structure as defined by claim 1, characterized by each blade having a plurality of rack teeth, and the elongated pinion teeth being of peripherally interrupted character and multiple in number.

8. A structure as defined by claim 1, characterized by the second mentioned threaded connection being of helical type, the pitch diameter of the pinion teeth being appreciably less than that of the helical gear type threaded connection tooth portion thereof, the latter being at one end of the pinion.

9. A structure as defined by claim 1, characterized by the chamber being elongated and having an axis transverse to the body portion axis, the chamber opening at opposite ends upon the exterior of the body portion, the adjusting bolt having a face adjacent the tool engageable portion thereof and bearing upon a shoulder in said chamber opening at one end, and means in the chamber opening at the opposite end preventing axial movement of the bolt in the chamber, the second mentioned threaded connection being of helical type, the pitch diameter of the pinion teeth being appreciably less than that of the helical gear type threaded connection tooth portion thereof, the latter being at one end of the pinion, the said opposite opening receivable means limiting pinion movement longitudinally of the bolt in one direction.

10. A structure as defined by claim 1, characterized by the chamber being elongated and having an axis transverse to the body portion axis, the chamber opening at opposite ends upon the exterior of the body portion, the adjusting bolt having a face adjacent the tool engageable portion thereof and bearing upon a shoulder in said chamber opening at one end, means in the chamber opening at the opposite end preventing axial movement of the bolt in the chamber, and means extending through the said opposite opening receivable means and into the body portion for securing the said opening receivable means thereto.

11. A structure as defined by claim 1, characterized by the chamber being elongated and having an axis transverse to the body portion axis, the chamber opening at opposite ends upon the exterior of the body portion, the adjusting bolt having a face adjacent the tool engageable portion thereof and bearing upon a shoulder in said chamber opening at one end, means in the chamber opening at the opposite end preventing axial movement of the bolt in the chamber, the second mentioned threaded connection being of helical type, the pitch diameter of the pinion teeth being appreciably less than that of the helical gear type threaded connection tooth portion thereof, the latter being at one end of the pinion, the chamber opposite opening receivable means limiting pinion movement longitudinally of the bolt in one direction, and means extending through the chamber opposite opening receivable means and into the body portion for securing the said opening receivable means thereto.

12. A structure as defined by claim 1, characterized by the addition of means for locking the blades in adjusted position, said means including an individual lock of eccentric character for each blade, the slots being aligned, the blades being an even number and diametrically positioned in the body portion, and the second mentioned threaded connection being of helical gear type, the pinion teeth being of spur gear type and the blade meshing teeth being of rack type.

13. A structure as defined by claim 1, characterized by the second mentioned threaded connection being of helical gear type, the pinion teeth being elongated and of spur gear type and the blade meshing teeth being of rack type, the elongated pinion teeth being of peripherally interrupted character and multiple in number.

14. A structure as defined by claim 1, characterized by the addition of a dial type graduated scale reading directly in units of blade linear movement for bolt rotation movement and readable in conjunction with that rotation.

15. In combination a pair of slidably supported blades, each having an extended end of tangential character with reference to a central axis, each end including a pair of rack teeth, a pinion concentric with the axis and having a plurality of gear teeth thereon adjacent each toothed end and meshable therewith, a threaded bolt manually rotatable but incapable of relative axial movement, the pinion being threaded on the bolt and the teeth of the pinion being elongated, a stationary helical internal gear, and an external helical gear meshing therewith and rigid with the pinion for blade movement responsive and proportional to bolt rotation.

16. In combination a pair of slidably supported blades, each having an extended end of tangential character with reference to a central axis, each end including a pair of rack teeth, a pinion concentric with the axis and having a plurality of gear teeth thereon adjacent each toothed end and meshable therewith, a threaded bolt manually rotatable but incapable of relative axial movement, the pinion being threaded on the bolt and the teeth of the pinion being elongated, a stationary helical internal gear, an external helical gear meshing therewith and rigid with the pinion for blade movement responsive and proportional to bolt rotation, and means for locking the blades in adjusted position.

17. In combination a pair of slidably supported blades, each having an extended end of tangential character with reference to a central axis, each end including a pair of rack teeth, a pinion concentric with the axis and having a plurality of gear teeth thereon adjacent each toothed end and meshable therewith, a threaded bolt manually rotatable but incapable of relative axial movement, the pinion being threaded on the bolt and the teeth of the pinion being elongated, a stationary helical internal gear, an external helical gear meshing therewith and rigid with the pinion for blade movement responsive and proportion to bolt rotation, and means for locking the blades in adjusted position, said locking means including an eccentric type lock for each blade.

18. In combination a threaded, rotatable, axially immovable member, a complementarily threaded coaxial member, means engageable by the latter member and permitting regulated rotation of the latter member in its axial movement incident to first member rotation, tooth means on the second member, and a third member having toothed means engageable by the second member toothed means for third member movement in accordance with and proportion to first member rotation.

19. A combination as defined by claim 18, characterized by the first member being externally threaded and the second member being internally threaded.

20. A combination as defined by claim 18, characterized by the first mentioned means being of helical gear type and the second member having a complementary helical gear portion engageable therewith, the tooth means on the second member being of spur gear type and the third member tooth means being of complementary gear tooth engageable character.

RALPH H. MORGAN.